(12) United States Patent
Chuang et al.

(10) Patent No.: US 8,709,624 B2
(45) Date of Patent: Apr. 29, 2014

(54) ENERGY STORAGE DEVICE PACKAGE

(75) Inventors: Ming-Te Chuang, Taoyuan Hsien (TW);
Kuang-Jung Tan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 94 days.

(21) Appl. No.: 13/237,947

(22) Filed: Sep. 21, 2011

(65) Prior Publication Data

US 2012/0328913 A1 Dec. 27, 2012

(30) Foreign Application Priority Data

Jun. 27, 2011 (TW) .............................. 100122404 A

(51) Int. Cl.
*H01M 2/12* (2006.01)

(52) U.S. Cl.
USPC ................................ 429/53; 429/54; 429/185

(58) Field of Classification Search
USPC .......................... 429/53, 54, 55, 185; 361/521
See application file for complete search history.

(56) References Cited

U.S. PATENT DOCUMENTS

| | | | | |
|---|---|---|---|---|
| 3,537,902 A | * | 11/1970 | Murata | 429/55 |
| 4,338,382 A | * | 7/1982 | Fritts | 429/53 |
| 5,258,242 A | * | 11/1993 | Dean et al. | 429/54 |
| 6,296,967 B1 | * | 10/2001 | Jacobs et al. | 429/185 X |
| 6,346,346 B1 | * | 2/2002 | Naskali | 429/185 X |
| 6,528,206 B2 | | 3/2003 | Ruiz Rodriguez et al. | |
| 6,660,430 B1 | * | 12/2003 | Yoshida et al. | 429/185 |
| 2001/0006746 A1 | | 7/2001 | Kageyama | |
| 2004/0180260 A1 | | 9/2004 | Somatomo et al. | |
| 2008/0160395 A1 | | 7/2008 | Okada et al. | |
| 2008/0206633 A1 | | 8/2008 | Matsuoka | |

FOREIGN PATENT DOCUMENTS

| | | |
|---|---|---|
| TW | 432736 | 5/2001 |
| TW | 465135 | 11/2001 |
| TW | 494594 | 7/2002 |
| TW | 557594 | 10/2003 |

\* cited by examiner

*Primary Examiner* — Stephen J. Kalafut
(74) *Attorney, Agent, or Firm* — CKC & Partners Co., Ltd.

(57) ABSTRACT

An energy storage device package is provided. The energy storage device package includes a bottom cover and a top cover connected to form a hollow chamber to accumulate an electrolyte, a first electrode and a second electrode formed on the top cover and which stretch from the top cover to the hollow chamber to contact the electrolyte, and a safety valve. The first electrode includes an opening and an exhaust channel that extends between the hollow chamber and the opening. When a gas pressure in the hollow chamber is smaller than or equal to a threshold value, the safety valve in the first electrode blocks the exhaust channel. When the gas pressure is larger than the threshold value, the gas pushes to open the safety valve and flows out from the hollow chamber through the exhaust channel and the opening.

15 Claims, 6 Drawing Sheets

ENERGY STORAGE DEVICE PACKAGE

RELATED APPLICATIONS

This application claims priority to Taiwan Application Serial Number 100122404, filed Jun. 27, 2011, which is herein incorporated by reference.

BACKGROUND

1. Technical Field

The present disclosure relates to a package structure. More particularly, the present disclosure relates to an energy storage device package.

2. Description of Related Art

An energy storage device, such as a battery or a supercapacitor (also called electric double layer capacitors in some applications), can perform conversion between chemical energy and electrical energy to release or store energy, i.e., discharge or charge. During the conversion of energy or when the environment in which the energy storage device is situated changes (e.g., the temperature rises), the volume of gas which is generated in the energy storage device expands. In order to maintain a balance of gas pressure, an opening is often formed directly on the package of the energy storage device such that the expanded gas can flow out of the package through the opening. However, the opening may results in the leakage of an electrolyte from the package thereof. The leaked electrolyte may do harm to humans or pollute the environment.

Accordingly, what is needed is an energy storage device package that is able to release gas pressure without resulting in the leakage of the electrolyte from the energy storage device package. The present disclosure addresses such a need.

SUMMARY

An aspect of the present disclosure is to provide an energy storage device package. The energy storage device package comprises a bottom cover, a top cover, a first electrode, a second electrode, and a safety valve. The top cover is connected to the bottom cover to form a hollow chamber to accumulate an electrolyte. The first electrode is formed on the top cover and stretches from the top cover to the hollow chamber to contact the electrolyte. The first electrode comprises an opening and an exhaust channel that extends between the hollow chamber and the opening. The second electrode is formed on the top cover and stretches from the top cover to the hollow chamber to contact the electrolyte. The safety valve is formed in the first electrode. When a gas pressure in the hollow chamber is smaller than or equal to a threshold value, the safety valve in the first electrode blocks the exhaust channel. When the gas pressure increases such that the gas pressure is larger than the threshold value, gas in the hollow chamber pushes to open the safety valve, thereby allow part of the gas to flow out from the hollow chamber through the exhaust channel and the opening.

According to an embodiment of the present disclosure, the safety valve comprises a cover plate and an elastic body. The cover plate has a through hole. The edge of the cover plate is press-fitted to the inner edge of the opening. A normal projection area of the elastic body is smaller than or equal to a normal projection area of the cover plate, and a cross-sectional area of the exhaust channel is smaller than or equal to the normal projection area of the elastic body. The elastic body is disposed between the cover plate and the exhaust channel to cover the exhaust channel when the gas pressure in the hollow chamber is smaller than or equal to the threshold value. When the gas pressure increases such that the gas pressure is larger than the threshold value, the gas in the hollow chamber pushes the elastic body, which in turn pushes the cover plate to thereby allow part of the gas to flow out from the hollow chamber through the exhaust channel, the through hole, and the opening. The electrolyte is poured into the hollow chamber through the exhaust channel when the cover plate and the elastic body are not covered thereon.

According to another embodiment of the present disclosure, the cover plate and the elastic body are made out of one piece.

According to yet another embodiment of the present disclosure, the safety valve comprises a cover plate and an elastic body. The cover plate has a through hole and is press-fitted to the inner edge of the opening. The elastic body is moveably disposed on the cover plate to block the through hole. A cross-sectional area of the exhaust channel is smaller than or equal to a normal projection area of the cover plate. The cover plate is disposed between the elastic body and the exhaust channel to cover the exhaust channel when the gas pressure in the hollow chamber is smaller than or equal to the threshold value. When the gas pressure increases such that the gas pressure is larger than the threshold value, the gas in the hollow chamber pushes the cover plate to thereby allow part of the gas to flow out from the hollow chamber through the exhaust channel, the through hole, and the opening. The electrolyte is poured into the hollow chamber through the exhaust channel when the cover plate and the elastic body are not covered thereon.

According to yet another embodiment of the present disclosure, the energy storage device package further comprises at least one group of electrode plates disposed in the hollow chamber. The first electrode and the second electrode are electrically connected to the group of electrode plates. The group of electrode plates comprises a positive electrode plate, a negative electrode plate, and an isolation plate between the positive electrode plate and the negative electrode plate. The first electrode and the second electrode are electrically connected to an external electronic element to make the electrolyte perform an electrochemical reaction through the group of electrode plates.

According to still another embodiment of the present disclosure, the energy storage device package is used in a battery or a supercapacitor.

According to further another embodiment of the present disclosure, the top cover and the bottom cover are connected with glue, through a hot-melt welding process, or through an ultrasonic welding process. The top cover and the bottom cover are made of aluminum, iron, alloy, metal film, or combinations thereof. While the top cover and the bottom cover can also be made of polymer.

An aspect of the present disclosure is to provide an energy storage device package. The energy storage device package comprises a bottom cover, a top cover, a first electrode, a second electrode, and a safety valve. The top cover is connected to the bottom cover to form a hollow chamber to accumulate an electrolyte. The first electrode is formed on the top cover and stretches from the top cover to the hollow chamber to contact the electrolyte. The first electrode comprises an opening and an exhaust channel that extends between the hollow chamber and the opening. The second electrode is formed on the top cover and stretches from the top cover to the hollow chamber to contact the electrolyte. The second electrode comprises a pour channel and a seal body. The pour channel passes through the second electrode, and the seal body seals the pour channel after the electrolyte is poured into the hollow chamber through the pour channel. The safety valve is formed in the first electrode. When a gas pressure in the hollow chamber is smaller than or equal to a threshold value, the safety valve in the first electrode blocks the exhaust channel. When the gas pressure increases such that the gas pressure is larger than the threshold value, gas in the hollow chamber pushes to open the safety valve, thereby allowing part of the gas to flow out from the hollow chamber through the exhaust channel and the opening.

According to an embodiment of the present disclosure, the seal body is made of metal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments of the disclosure, with reference made to the accompanying drawings as follows.

DETAILED DESCRIPTION

Figure 1:
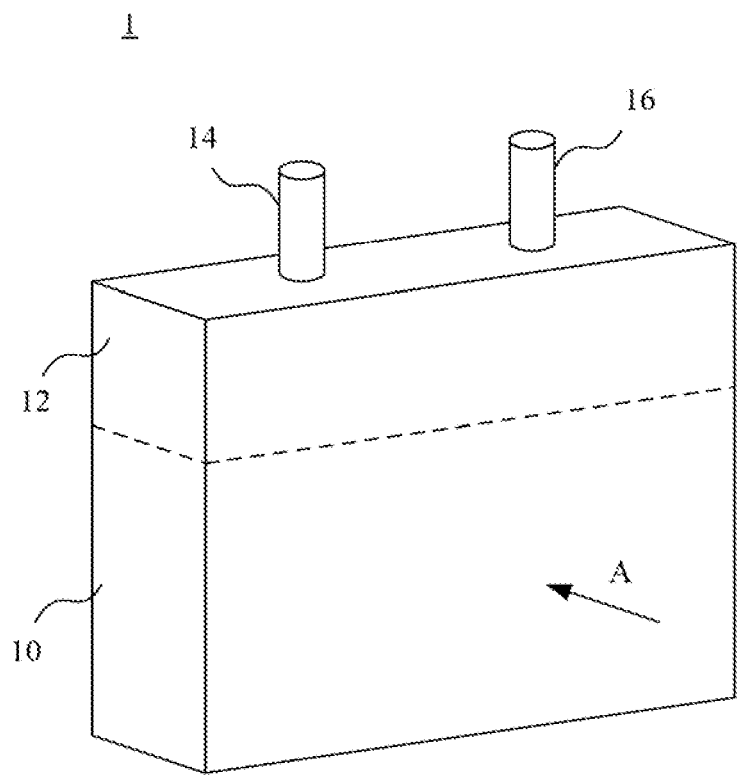
FIG. 1 is a perspective diagram of an energy storage device package in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
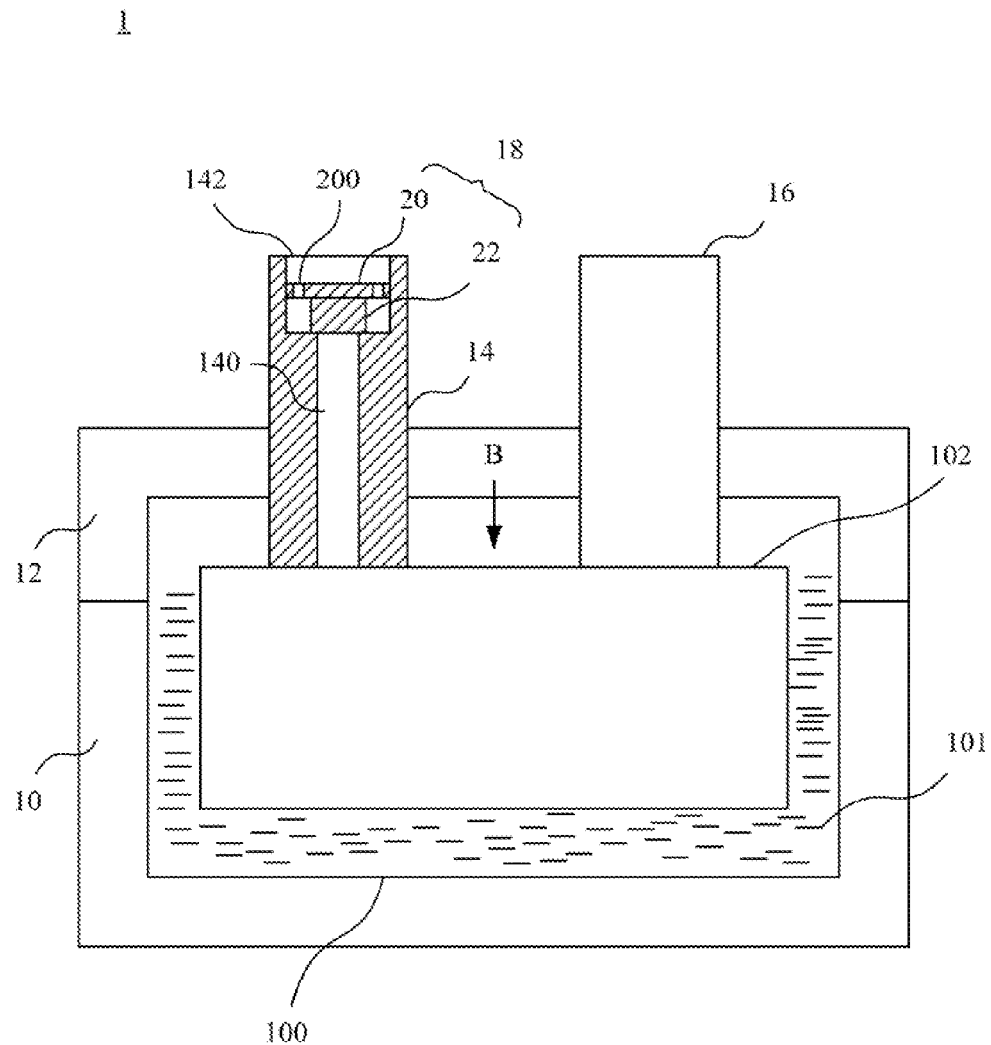
FIG. 2A is a schematic diagram, partially in cross section, illustrating the inner structure of the energy storage device package in FIG. 1 when viewed from direction A.

FIG. 1 is a perspective diagram of an energy storage device package 1 in an embodiment of the present disclosure. FIG. 2A is a schematic diagram, partially in cross section, illustrating the inner structure of the energy storage device package 1 in FIG. 1 when viewed from direction A. The energy storage device package 1 at least comprises a bottom cover 10, a top cover 12, a first electrode 14, a second electrode 16, and a safety valve 18 (shown in FIG. 2A).

The energy storage device package 1 is used in an energy storage device. In an embodiment, the energy storage device is a battery or a supercapacitor which performs conversion between chemical energy and electrical energy to release or store energy as mentioned. The bottom cover 10 and the top cover 12 of the energy storage device package 1 are connected together so as to form a hollow chamber 100. In an embodiment, the top cover 12 and the bottom cover 10 are made of aluminum, iron, aluminum film, alloy, or other metal raw material or films. In other embodiments, the top cover 12 and the bottom cover 10 are made of polymer, such as rubber or plastic. In some embodiments, the top cover 12 and the bottom cover 10 are connected with glue, through a hot-melt welding process, or through an ultrasonic welding process such that the hollow chamber 100 is formed or defined between the bottom cover 10 and the top cover 12.

The hollow chamber 100 accumulates an electrolyte (solution) 101. In an embodiment, the electrolyte 101 is an alkaline electrolyte. The first electrode 14 and the second electrode 16 are formed on the top cover 12 and stretch from the top cover 12 to inside of the hollow chamber 100 to partially contact the electrolyte 101. In an embodiment, the energy storage device package 1 further comprises at least one group of electrode plates 102 disposed in the hollow chamber 100, and at least a part of the group of electrode plates 102 is in contact with the electrolyte 101.

Figure 2B:
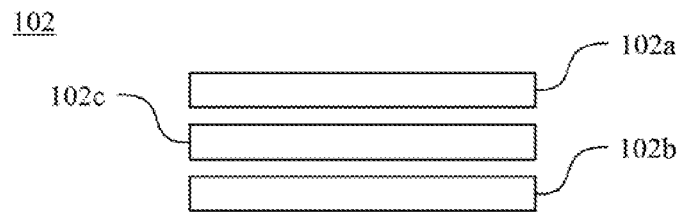
FIG. 2B is a top view of a group of electrode plates depicted in FIG. 2A when viewed from direction B in an embodiment of the present disclosure.

FIG. 2B is a top view of the group of electrode plates 102 depicted in FIG. 2A when viewed from direction B in an embodiment of the present disclosure. The group of electrode plates 102 in the present embodiment comprises a positive electrode plate 102a, a negative electrode plate 102b, and an isolation plate 102c. The first electrode 14 and the second electrode 16 are electrically connected to the group of electrode plates 102, respectively. One of the electrode 14 and the second electrode 16 which connected to the positive in electrode plate 102a is defined the positive electrode, and the other one which connected to the negative electrode plate 102b is defined the negative electrode, but this arrangement should not in order to limit the present disclosure. The isolation plate 102c is disposed between the positive electrode plate 102a and the negative electrode plate 102b, and thus isolates the positive electrode plate 102a and the negative electrode plate 102b to prevent a short circuit condition caused by contact between the two electrode plates 102a, 102b. It is noted, the positive electrode plate 102a, the isolation plate 102c, and the negative electrode plate 102b may be disposed right closed to each by each (not shown) or be disposed with gaps thereof as shown in FIG. 2B. The first electrode 14 and the second electrode 16 are further electrically connected to an external electronic element (not shown) to make the electrolyte 101 performing an electrochemical reaction through the voltage difference between the positive and the negative electrodes in the group of electrode plates 102 and the displacement of the ions in the electrolyte 101. In other embodiments, the positive electrode plate 102a, the negative electrode plate 102b, and the isolation plate 102c can be wound up in a jelly-roll-shaped configuration (not shown), or can be arranged in other forms such that they are in equivalent. In different embodiments, there can be several (i.e., more than one) groups of electrode plates to accomplish higher energy releasing or energy storing efficiency.

Referring back to FIG. 2A, the first electrode 14 comprises an exhaust channel 140 and an opening 142. The exhaust channel 140 extends between the hollow chamber 100 and the opening 142. The safety valve 18 is formed in the first electrode 14. In the present embodiment, the safety valve 18 comprises a cover plate 20 and an elastic body 22.

To aid in the explanation to follow, it is assumed that direction B in FIG. 2A is a normal direction, that is, normal to an imaginary plane that intersects the energy storage device package 1, or normal to a plane formed by an upper surface of the top cover 12 or a lower surface of the bottom cover 10.

The edge of the cover plate 20 is press-fitted to the inner edge of the opening 142. As refer to FIG. 2A and the definition of "normal" abovementioned, a normal projection area of the elastic body 22 is smaller than or equal to a normal projection area of the cover plate 20, and a cross-sectional area of the exhaust channel 140 (i.e., an area of the exhaust channel 140 lying on another imaginary plane that intersects the first electrode 14 and to which direction B is normalized) is smaller than or equal to the normal projection area of the elastic body 22. The elastic body 22 is disposed between the cover plate 20 and the exhaust channel 140. In some embodiments, the cover plate 20 and the elastic body 22 are made out of one piece. In different embodiments, the cover plate 20 and the elastic body 22 are made separately.

When the energy storage device package 1 is operated in a normal environment (e.g., under a normal temperature condition), the gas pressure of the gas generated in the hollow chamber 100 is smaller than or equal to a threshold value, that is, the gas pressure is in a reasonable range. Wherein, the gas is generated due to the electrochemical reaction (or other reactions) as mentioned. Hence, as depicted in FIG. 2A, the elastic body 22 blocks the exhaust channel 140 to thereby prevent the leakage of the electrolyte 101 and/or gas from the hollow chamber 100.

Figure 2C:
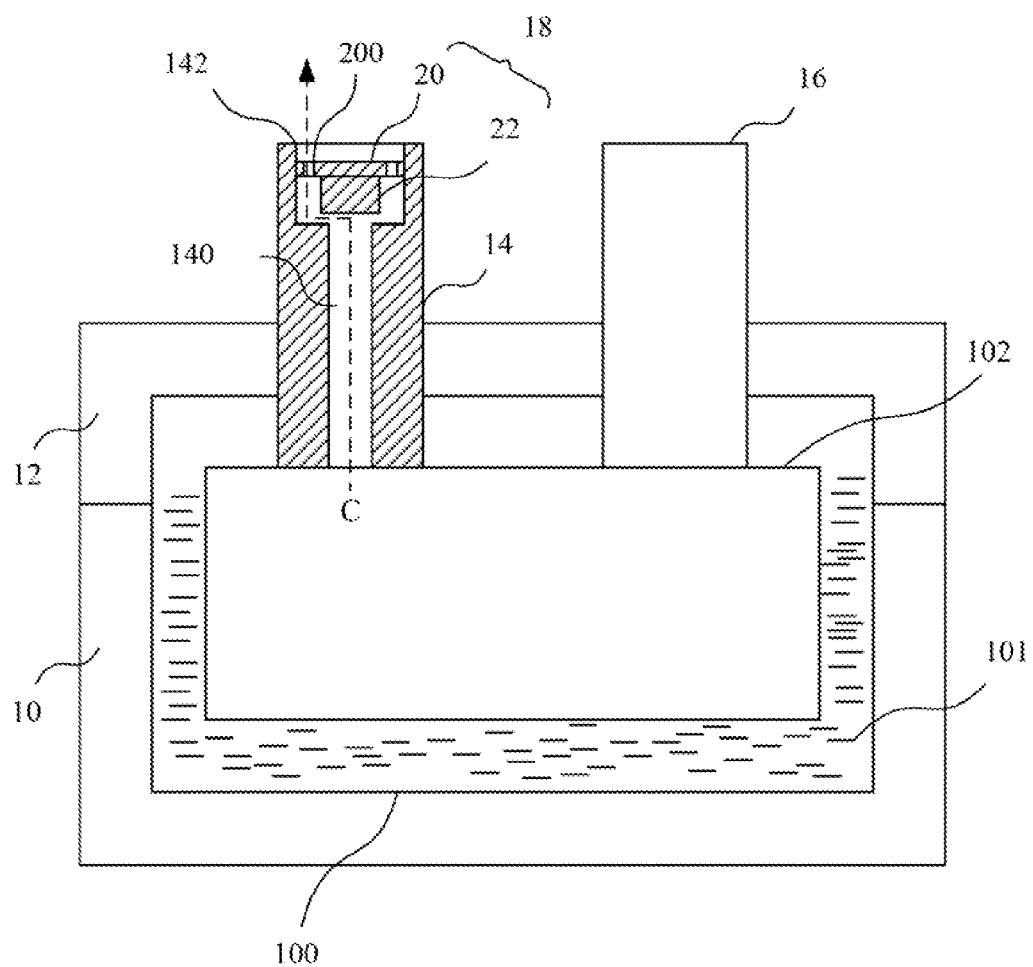
FIG. 2C is a diagram similar to FIG. 2A, illustrating the energy storage device package when gas pressure therein exceeds a threshold value.

FIG. 2C is a diagram similar to FIG. 2A, illustrating the energy storage device package 1 when the gas pressure therein exceeds the threshold value. When the energy storage device package 1 is in a high-temperature or other type of environment having an abnormal condition, or is otherwise operated until overheating results, the gas pressure therein may increase and thus exceed the threshold value. Consequently, the gas in the hollow chamber 100 pushes the elastic body 22, which in turn pushes the cover plate 20. In the present embodiment, the cover plate 20 has a through hole 200 to communicate the spaces on opposite sides of the cover plate 20. After the gas pushes the safety valve 18, which comprises the elastic body 22 and the cover plate 20, part of the gas flows out of the energy storage device package 1 from the hollow chamber 100 through the exhaust channel 140, the through hole 200, and the opening 142 along an imagined exhaust path C depicted in FIG. 2C. It is noted that, the imagined exhaust path C is just an explanatory route showing how the gas is exhausted, and the threshold value described above can be within a reasonable range relative to a specific value. In other embodiments, rather than using a particular threshold value, a percentage based on a particular normal gas pressure value is used, and the safety value 18 operates when the gas pressure in the energy storage device package 1 exceeds the normal gas pressure value by a prior set percentage.

During assembling, the electrolyte 101 is poured into the hollow chamber 100 through the exhaust channel 140 when the cover plate 20 and the elastic body 22 are not covered thereon. However, in other embodiments, the electrolyte 101 may be introduced into the hollow chamber 100 by using an alternative configuration of the energy storage device package 1.

Figure 2D:
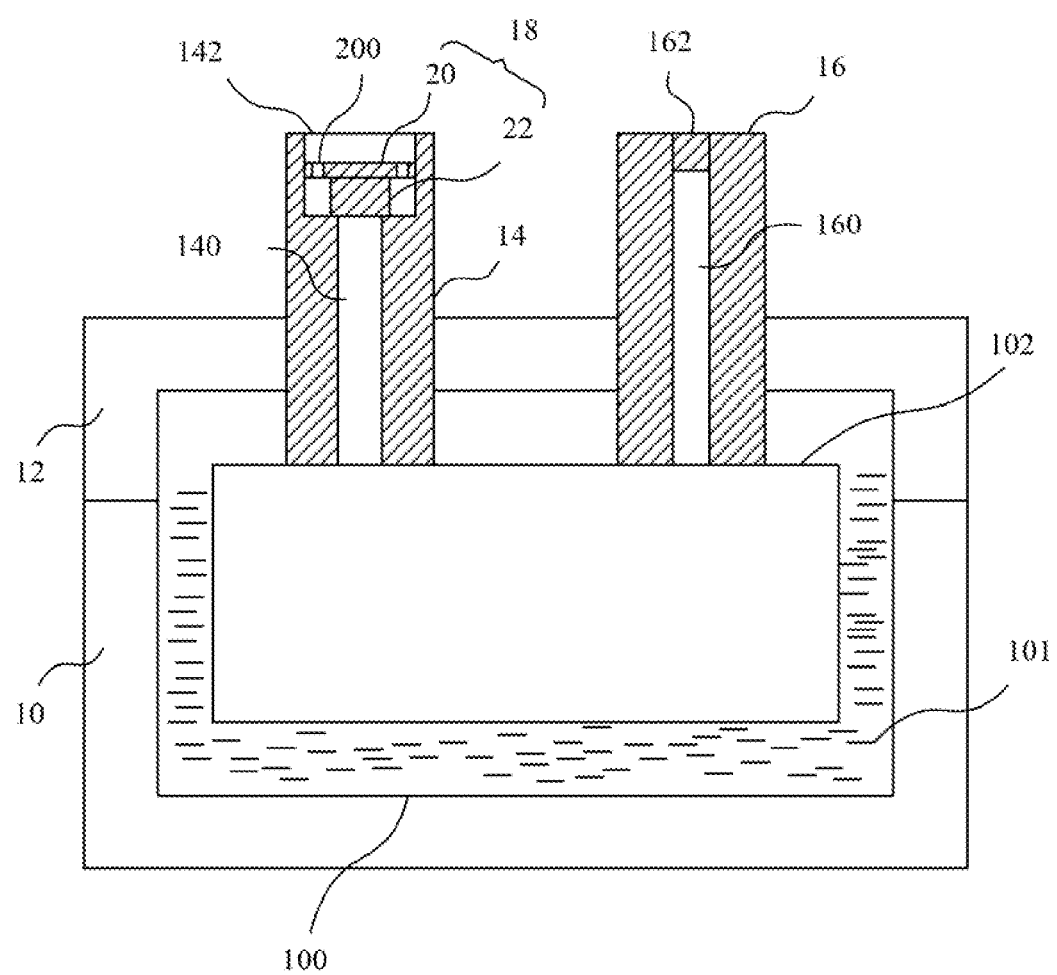
FIG. 2D is a schematic diagram, partially in cross section, illustrating the inner structure of the energy storage device package in FIG. 1 when viewed from direction A in another embodiment of the present disclosure.

FIG. 2D is a schematic diagram, partially in cross section, illustrating the inner structure of the energy storage device package 1 in FIG. 1 when viewed from direction A in another embodiment of the present disclosure. As depicted in FIG. 2D, a pour channel 160 is formed in the second electrode 16 which passes through the second electrode 16. The electrolyte 101 is poured into the hollow chamber 100 through the pour channel 160. Further, a seal body 162 is disposed to seal the pour channel 160 after the electrolyte 101 is poured into the hollow chamber 100 through the pour channel 160 to prevent the leakage of the electrolyte 101 and/or gas. In an embodiment, the seal body 162 is made of metal for example, but should not to limit the present disclosure, however, the seal boy may also be made of suitable polymer.

Hence, there is no need to form a safety valve by drilling a hole in the top cover 12 or the bottom cover 10 of the energy storage device package 1 in the present disclosure. Accordingly, such kind a source of leakage (i.e., drilled hole) of the electrolyte is eliminated so as to avoid the occurrence of the electrical capillary phenomenon. The cost for forming a safety valve on the conventional package can be reduced as well. Consequently, using the energy storage device package 1 in the present disclosure decreases both the manufacturing cost and the chance of electrolyte leakage.

Figure 3A:
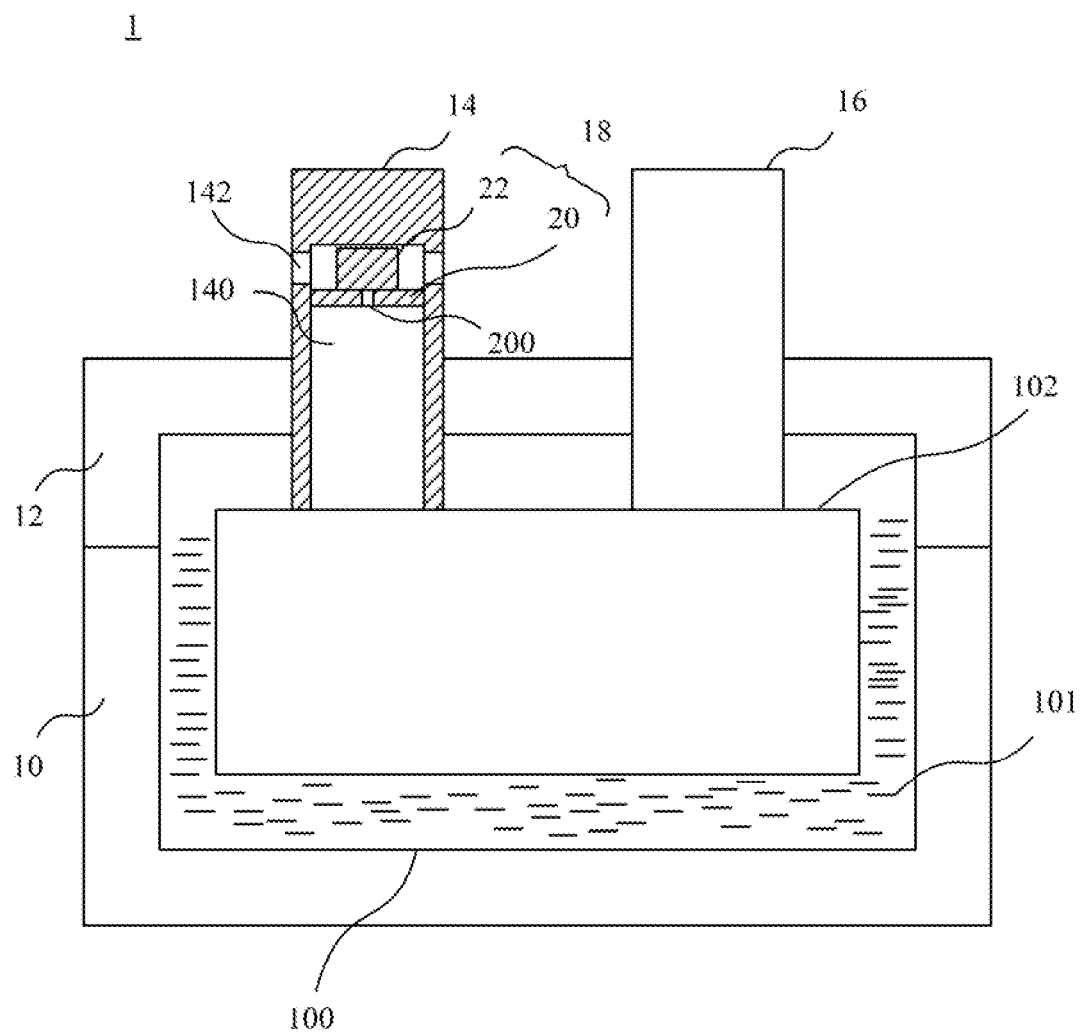
FIG. 3A is a schematic diagram, partially in cross section, illustrating the inner structure of the energy storage device package in FIG. 1 when viewed from direction A in yet another embodiment of the present disclosure.

FIG. 3A is a schematic diagram, partially in cross section, illustrating the inner structure of the energy storage device package 1 in FIG. 1 when viewed from direction A in yet another embodiment of the present disclosure. The energy storage device package 1 comprises a bottom cover 10, a top cover 12, a first electrode 14, a second electrode 16, and a safety valve 18.

The bottom cover 10, the top cover 12, and the hollow chamber 100 are similar to those in FIG. 2A, and therefore, details in this regard will not be repeated herein. In the present embodiment, the first electrode 14 comprises an exhaust channel 140 and an opening 142. The exhaust channel 140 is communicated between with the hollow chamber 100 and the opening 142. The safety valve 18 is formed in the first electrode 14. In the present embodiment, the safety valve 18 comprises a cover plate 20 and an elastic body 22.

The cover plate 20 is press-fitted to the inner edge of the opening 142. A cross-sectional area of the exhaust channel 140 is smaller than or equal to a normal projection area of the cover plate 20. The cover plate 20 is disposed between the elastic body 22 and the exhaust channel 140. The cover plate 20 has a through hole 200 to communicate the spaces on opposite sides of the cover plate 20.

When the energy storage device package 1 is operated in a normal environment (e.g., under a normal temperature condition), the gas pressure of the gas generated in the hollow chamber 100 is smaller than or equal to a threshold value, that is, the gas pressure is in a reasonable range. Hence, as depicted in FIG. 3A and described above, the elastic body 22 is moveably disposed on the cover plate 20 and thus blocks the through hole 200 of the cover plate 20 to thereby close off the exhaust channel 140. As a result, leakage of the electrolyte 101 and/or gas from the hollow chamber 100 is prevented.

Figure 3B:
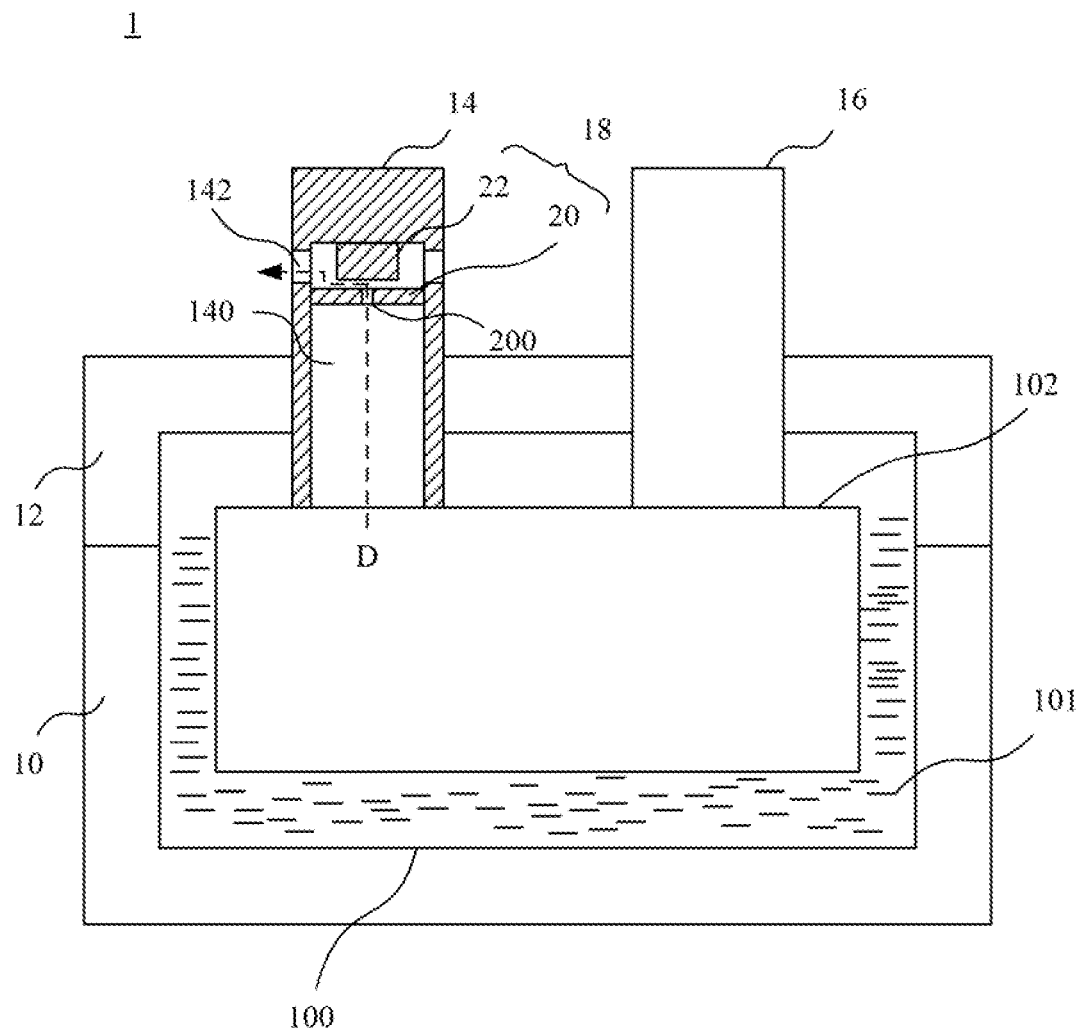
FIG. 3B is a diagram similar to FIG. 3A, illustrating the energy storage device package when gas pressure therein exceeds a threshold value.

FIG. 3B is a diagram similar to FIG. 3A, illustrating the energy storage device package 1 when the gas pressure therein exceeds a threshold value. When the energy storage device package 1 is in a high-temperature or other type of environment having an abnormal condition, or is otherwise operated until overheating results, the gas pressure therein may increase and exceed the threshold value. Consequently, the gas in the hollow chamber 100 pushes the elastic body 22 so as to unblock the through hole 200 of the cover plate 20. After the gas pushes the safety valve 18, which comprises the elastic body 22 and the cover plate 20, part of the gas flows out of the energy storage device package 1 from the hollow chamber 100 through the exhaust channel 140, the through hole 200, and the opening 142 along an imagined exhaust path D depicted in FIG. 3B. It is noted that, the imagined exhaust path D is also an explanatory route showing how the gas is exhausted as abovementioned.

Similar to embodiments described above, the electrolyte 101 can be poured into the hollow chamber 100 through the exhaust channel 140 when the cover plate 20 and the elastic body 22 are not covered thereon. In other embodiments, the pour channel 160 in the second electrode 16 as depicted in FIG. 2D can be formed such that the electrolyte 101 is poured into the hollow chamber 100 through the pour channel 160. A seal body 162 can be disposed to seal the pour channel 160 after the electrolyte 101 is poured into the hollow chamber 100.

Hence, also in these embodiments of the present disclosure, there is no need to form a safety valve by drilling a hole in the top cover 12 or bottom cover 10 of the energy storage device package 1. Accordingly, such a source of leakage of the electrolyte is eliminated to avoid the occurrence of the electrical capillary phenomenon. The cost for forming a safety valve on the top cover 12 or bottom cover 10 can be reduced as well. Consequently, using the energy storage device package 1 in the present disclosure decreases both the manufacturing cost and the chance of electrolyte leakage.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An energy storage device package comprising:
   a bottom cover;
   a top cover connected to the bottom cover to form a hollow chamber to accumulate an electrolyte;
   a first electrode formed on the top cover and which stretches from the top cover to the hollow chamber to contact the electrolyte, the first electrode comprises an opening and an exhaust channel that extends between the hollow chamber and the opening;
   a second electrode formed on the top cover and which stretches from the top cover to the hollow chamber to contact the electrolyte; and
   a safety valve formed in the first electrode, wherein the safety valve comprises:
      a cover plate having a through hole, the edge of the cover plate is press-fitted to the inner edge of the opening; and
      an elastic body, wherein a normal projection area of the elastic body is smaller than or equal to a normal projection area of the cover plate, and a cross-sectional area of the exhaust channel is smaller than or equal to the normal projection area of the elastic body;
   wherein when a gas pressure in the hollow chamber is smaller than or equal to a threshold value, the elastic body is disposed between the cover plate and the exhaust channel to cover the exhaust channel such that the safety valve in the first electrode blocks the exhaust channel; and
   when the gas pressure increases such that the gas pressure is larger than the threshold value, gas in the hollow chamber pushes to open the safety valve, thereby allowing part of the gas to flow out from the hollow chamber through the exhaust channel and the opening.

2. The energy storage device package of claim 1, wherein when the gas pressure increases such that the gas pressure is larger than the threshold value, the gas in the hollow chamber pushes the elastic body, which in turn pushes the cover plate to thereby allow part of the gas to flow out from the hollow chamber through the exhaust channel, the through hole, and the opening.

3. The energy storage device package of claim 1, wherein the electrolyte is poured into the hollow chamber through the exhaust channel when the cover plate and the elastic body are not covered thereon.

4. The energy storage device package of claim 1, wherein the cover plate and the elastic body are made out of one piece.

5. The energy storage device package of claim 1, further comprising:
   at least one group of electrode plates disposed in the hollow chamber,
   wherein the first electrode and the second electrode are electrically connected to a group of electrode plates.

6. The energy storage device package of claim 5, wherein the group of electrode plates comprises:
   a positive electrode plate;
   a negative electrode plate, and
   an isolation plate between the positive electrode plate and the negative electrode plate.

7. The energy storage device package of claim 1 is used in a battery or a supercapacitor.

8. An energy storage device package comprising:
   a bottom cover;
   a top cover connected to the bottom cover to form a hollow chamber to accumulate an electrolyte;
   a first electrode formed on the top cover and which stretches from the top cover to the hollow chamber to contact the electrolyte, the first electrode comprises an opening and an exhaust channel that extends between the hollow chamber and the opening;
   a second electrode formed on the top cover and which stretches from the top cover to the hollow chamber to contact the electrolyte; and
   a safety valve formed in the first electrode, wherein the safety valve comprises:
      a cover plate having a through hole, the cover plate is press-fitted to the inner edge of the opening; and
      an elastic body moveably disposed on the cover plate to block the through hole, wherein a cross-sectional area of the exhaust channel is smaller than or equal to a normal projection area of the cover plate;
   wherein when a gas pressure in the hollow chamber is smaller than or equal to a threshold value, the cover plate is disposed between the elastic body and the exhaust channel to cover the exhaust channel such that the safety valve in the first electrode blocks the exhaust channel; and
   when the gas pressure increases such that the gas pressure is larger than the threshold value, gas in the hollow chamber pushes to open the safety valve, thereby allowing part of the gas to flow out from the hollow chamber through the exhaust channel and the opening.

9. The energy storage device package of claim 8, wherein when the gas pressure increases such that the gas pressure is larger than the threshold value, the gas in the hollow chamber pushes the elastic body to thereby allow part of the gas to flow out from the hollow chamber through the exhaust channel, the through hole, and the opening.

10. The energy storage device package of claim 8, wherein the electrolyte is poured into the hollow chamber through the exhaust channel when the cover plate and the elastic body are not covered thereon.

11. The energy storage device package of claim 8, further comprising:
   at least one group of electrode plates disposed in the hollow chamber,
   wherein the first electrode and the second electrode are electrically connected to a group of electrode plates.

12. The energy storage device package of claim 11, wherein the group of electrode plates comprises:
   a positive electrode plate;
   a negative electrode plate; and
   an isolation plate between the positive electrode plate and the negative electrode plate.

13. The energy storage device package of claim 8 is used in a battery or a supercapacitor.

14. An energy storage device package comprising:
   a bottom cover;
   a top cover connected to the bottom cover to form a hollow chamber to accumulate an electrolyte;
   a first electrode formed on the top cover and which stretches from the top cover to the hollow chamber to contact the electrolyte, the first electrode comprises an opening and an exhaust channel that extends between the hollow chamber and the opening;
   a second electrode formed on the top cover and which stretches from the top cover to the hollow chamber to contact the electrolyte, the second electrode comprises a pour channel and a seal body, the pour channel passes through the second electrode, and the seal body seals the pour channel after the electrolyte is poured into the hollow chamber through the pour channel; and
   a safety valve formed in the first electrode;
   wherein when a gas pressure in the hollow chamber is smaller than or equal to a threshold value, the safety valve in the first electrode blocks the exhaust channel: and
   when the gas pressure increases such that the gas pressure is larger than the threshold value, gas in the hollow chamber pushes to open the safety valve, thereby allowing part of the gas to flow out from the hollow chamber through the exhaust channel and the opening.

15. The energy storage device package of claim 14, wherein the seal body is made of metal.

* * * * *